United States Patent [19]
Orlowski

[11] 4,022,479
[45] May 10, 1977

[54] SEALING RINGS
[76] Inventor: David C. Orlowski, 10915 73rd Ave., Rock Island, Ill. 61201
[22] Filed: Jan. 2, 1976
[21] Appl. No.: 645,990
[52] U.S. Cl. .................................................. 277/53
[51] Int. Cl.² ........................................ F16J 15/44
[58] Field of Search ............................ 277/53–57

[56] References Cited
UNITED STATES PATENTS

| | | | |
|---|---|---|---|
| 1,780,804 | 11/1930 | Ward | 277/53 |
| 1,890,839 | 12/1932 | Young | 277/53 |
| 2,005,429 | 6/1935 | Lichenstein | 277/53 |
| 2,714,045 | 7/1955 | Simenson | 277/53 |

Primary Examiner—Robert I. Smith

[57] ABSTRACT

A sealing ring structure between a housing and a rotating shaft comprising a first ring member with axially opposite ends facing internally and externally of the housing and with the internal portion of the ring member having a series of internal labyrinth annular grooves disposed adjacent the shaft for retaining foreign materials within the housing. A second ring member is provided axially externally of the first ring member. The first ring member has an annular recess extending axially from its external face and the external ring has an axially extending flange that seats in the annular recess of the first member. A hole is provided in the first member that leads to the annular recess and on the underside thereof and which opens externally of the housing. The latter permits foreign matter that may move between a joint of the first and second members to be discarded through the hole. The first member is fixed to rotate with the shaft and to rotate relative to the first ring member.

10 Claims, 4 Drawing Figures

SEALING RINGS

BACKGROUND OF THE INVENTION

In certain industries it is extremely important that there be provided a seal for bearings that supports rotating shafts which prevent the lubricants associated with the bearings from leaking externally of an associated housing or bearing support and for preventing foreign particles in the environment which the shaft is being used from working itself through the seal and into the lubricant for the bearing. Such an industry is the food preparation industry in which it is extremely important that the lubricant does not mix with the food particles and in which the food particles do not work themselves into the bearings and lubricants.

It is heretofore been known to provide a metal sealing ring which is fixed to the bearing housing and has internal labyrinth-type grooves therein which tend to scrape lubricants moving axially along the shaft and to thereby prevent lubricants from moving externally of the housing. Conventionally with such a sealing ring there is provided an external cap that is fixed to the housing and has a sealing ring that fits externally of the aforementioned ring and which prevents material from moving internally of the housing through the latter ring. The difficulty with this type of arrangement is that there is no complete seal between the internal and external sides of the housing. The cap with its sealing ring surrounding the shaft while limiting movement of material into the housing nevertheless does permit some material from moving into it. This type of seal is never completely acceptable since the shaft is rotating relative to the seal and eventually the seal wears. This, of course, permits foreign matter to enter into the housing and to eventually damage the bearings. The life of the bearings is extremely long so long as they are properly lubricated and no foreign matter enters into the area. In the food industry, for example, in which large pumps handle the food, such pumps will in many instances operate twenty-four hours a day and continuously from day to day. Because of this, when the bearings do fail the entire line utilizing food products from the pump must be shut down. Also, if for any reason the lubricant for the bearings is permitted to move externally of the housing, the possibility of contaminating the food becomes greater and under normal procedure such a pump will be shut down until a new and suitable seal is provided.

SUMMARY OF THE INVENTION

With the above in mind, it is a primary object of the present invention to provide a sealing ring structure which practically eliminates the movement of the lubricant for the bearings outside of the housing. The sealing ring structure also practically eliminates the movement of foreign particles such as food particles into the bearing area and lubricant area within the housing.

More specifically, it is the object of the present invention to provide a sealing structure that is composed of two rings, preferably metal, one of which is fixed to the housing and the other of which is fixed to rotate with the shaft. The ring that is fixed to the housing has a labyrinth-type of seal against the shaft which prevents the lubricant from moving outside of the housing along the shaft. A joint is provided between the two rings which is composed of an annular recess in the first ring that opens axially outwardly of the housing and an annular flange on the adjoining outer ring that fits within the annular recess of the first ring. There are sufficient tolerances provided between the recess and annular flange so that the two bearing rings that are rotating relative to one another will not bind or create a heated frictional disposition between them. Provided in the first sealing ring is a hole that leads to its recess. The annular flange of the second sealing ring has notches cut therein. With such an arrangement foreign particles that may move in the joint formed by the recess and flanges will be scraped by the notches in the flanges to the hole where they will be discharged back into the atmosphere or the area surrounding the housing. The first ring is, of course, fixed to the housing and the second ring is, of course, fixed to rotate with the shaft by suitable sealing means. However, in both instances there is not movement between the respective sealing rings and the portion it is fixed to which would normally create wear if the opposite occurred.

DESCRIPTION OF THE PREFERRED EMBODIMENT

Figure 1:
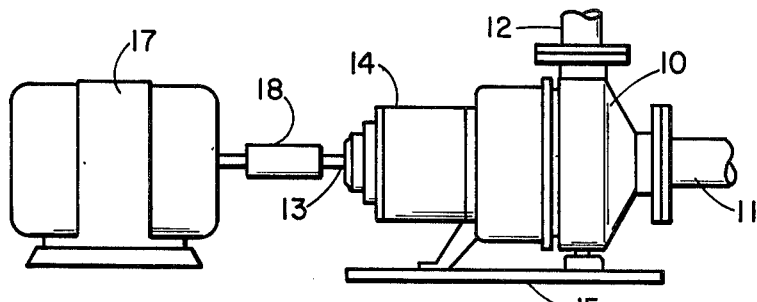
FIG. 1 is a side view of a food processing pump in which the sealing structure of the present invention may be used.

Referring first to FIG. 1 showing an arrangement in which the present sealing structure can be used, there is provided in a food processing plant, a pump 10 having an intake pipe 11 and a discharge pipe 12. The pump 10 is a conventional impeller-type having a main drive shaft 13 that is carried in a bearing housing 14. Both the housing 14 and pump housing 10 are fixed to a common platform 15. An electric motor 17 is provided for driving a shaft 13 and a coupling 18 is provided for connecting the motor shaft 17 to the pump drive shaft 13.

Figure 2:
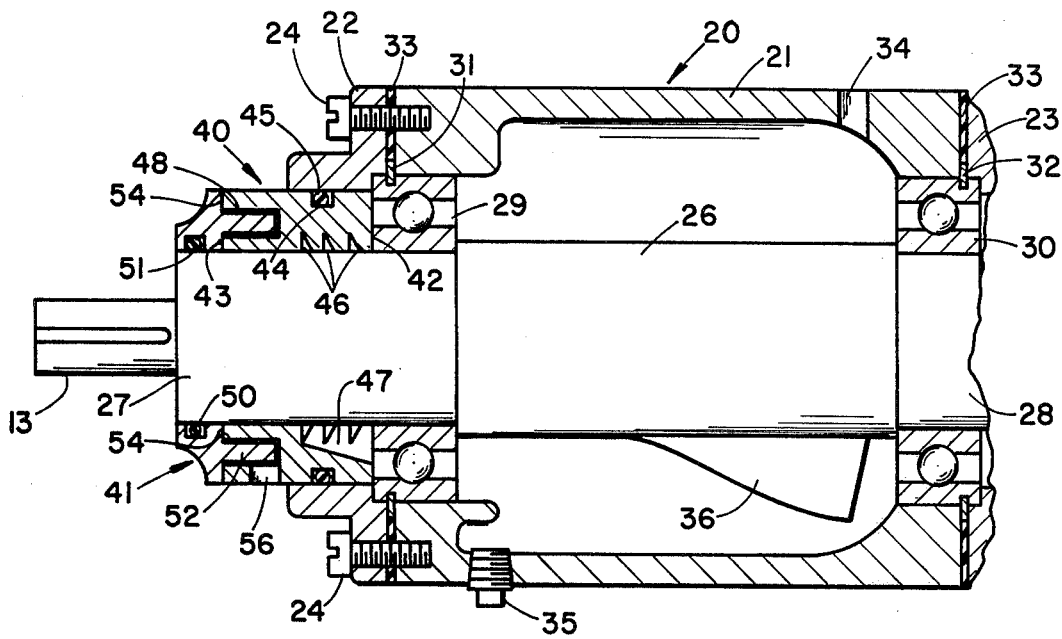
FIG. 2 is an enlarged vertical sectional view showing the present sealing structure with a ball bearing shaft and as taken at one end of the pump structure shown in FIG. 1.
Figure 3:
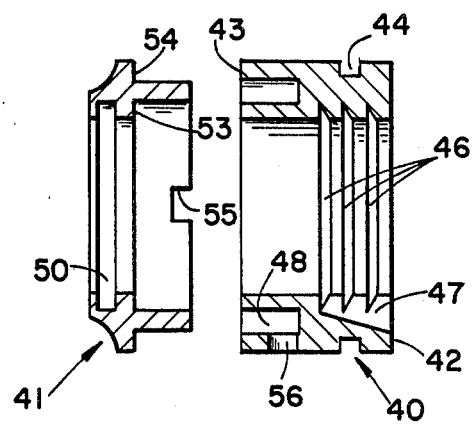
FIG. 3 is a vertical sectional exploded view of the sealing parts showing them separated.
Figure 4:
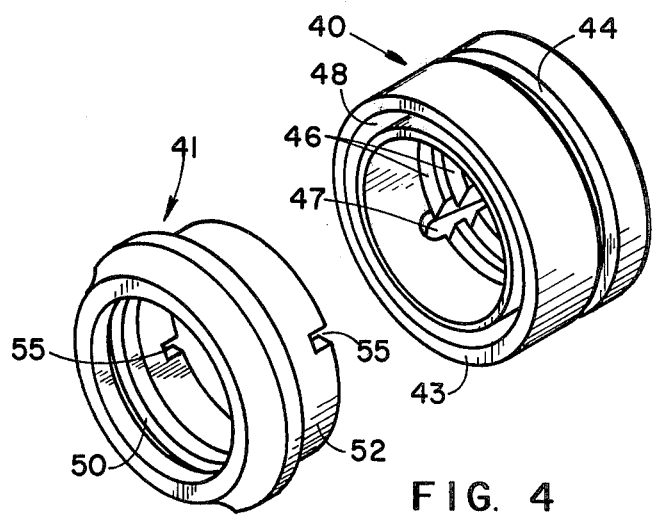
FIG. 4 is a perspective view of the parts shown in FIG. 3.

Referring now to FIG. 2, the shaft 13 is provided with a bearing housing 20 composed of a central barrel portion 21 and two end plates 22,23, the latter being fixed to the former by suitable bolts 24. The shaft 13 is provided with an enlarged central portion 26 with reduced end portions 28,28, the latter having shoulders with the enlarged portion 26 against which ball bearings 29,30 may bear. The outer race of the bearings 29,30 are provided with small annular slots that receive snap rings 31,32 which generally hold the bearings against axial movement. The snap rings 31,32 fit between the end plates 22, 23 and the ends of the central barrel portion 21 of the housing. Suitable gaskets such as at 33 are provided between the end plates 22,23 and the barrel portion 21 so as to prevent leakage of the lubricant internally of the housing. The central barrel portion 21 is provided with a lubricant inlet 34 and a drain plug 35. Lubricant is normally filled in the housing 20 to a height so that it will penetrate into the bearings 29,30. A swash blade 36 is fixed to the shaft so as to keep the lubricant agitated within the housing.

In order to prevent leakage of the lubricant from inside the housing 20 outwardly and the leakage of foreign particles from outside the housing into the bearings or lubricant, there is provided a sealing ring structure composed of a first ring 40 and a mating second ring 41. The first ring 40 has axially opposite ends 42,43 facing internally of the housing 20 and externally of the housing respectively. The ring 40 also has an external annular groove 44 in which seats an O-ring 45 that bears against a complementary circular opening in the end plate 22. The ring 40 is fixed against rotation with respect to the housing 20 by a swedge fit with respect to the plate 22. Three internal grooves 46 are provided on the inner surface of the ring 40 and provide radial shoulders which engage lubricant tending to move axially outwardly along the shaft portion 27 and to guide it into an axially extending groove on the underside of the ring 40. The groove 47 joins with the annular grooves 46 and oil that is caught in the grooves 46 will pass into the groove 47 and from there back into the housing 20. The end 43 of the ring 40 is provided with an annular recess 48 that extends axially from the face 43 and serves one part of the joint with the second ring member or cap 41.

The second or cap member 41 fits around the shaft portion 27 and has an internal annular groove 50 that carries an O-ring 51. The frictional engagement of the O-ring 51 between the cap 41 and the shaft portion 27 causes the second ring member 41 to be fixed to rotate with the shaft 32. The O-ring also limits axial movement of the member 41 on the shaft portion 27. The second ring or cap 41 is provided with an annular flange 52 that is complementary to and fits within the annular recess 48. The flange 52 extends axially from inner and outer radial faces 53,54 that are positioned alongside the end 43 of the first ring 40. The annular flange 52 is provided with a pair of diametrically opposite slots 55. A hole 56 is provided in the underside of the first ring 40 and extends to the recess 48. It should here be understood that the radial dimension of the flange 52 is from 0.005 inches to 0.015 inches smaller than the radial dimension of the recess 48. Consequently, the cap or ring 41 may rotate within the recess with practically zero friction between the respective surfaces.

Should foreign particles find their way into the junction of the ring 41 and ring 42, such particles must move around the adjoining outer surfaces of the annular flange 52 and annular recess 48. However, particles in this location will be swept or scraped by the edges of the slots 55 and will be moved to the opening 56 where the particles wil gravitate externally of the housing 20. Should any particles move around the end of the flange 48 to the inner surfaces of the flange 48, edges of the slots 55 will again contact the particles and through the centrifical action of the cap 41 will be forced outwardly to the outer side of the flange 48 where they will again be swept through the opening 56.

It should here be noted that while O-rings 45,57 are provided for seals, there is no relative rotation between the sealing surfaces of the O-rings. Therefore, the O-rings 45,51 will not wear and the possibility of breaking the seal at the O-rings is practically nonexistent.

I claim:

1. A ring seal between a fixed housing and a rotating shaft comprising: a first ring member having one end facing internally of the housing and a second end facing externally of the housing and being fixed and sealed to the housing and having a series of internal labyrinth annular grooves disposed adacent the shaft and an axially extending groove joining the annular grooves and opening to said first end and in communication with the housing, said first ring member further having an annular recess extending axially from and opening to said second end; and a second ring fixed to rotate with the shaft and having an annular flange extending axially from inner and outer radial surfaces and adapted for insertion in the annular recess with said radial surfaces bearing against the second end of the first ring member.

2. The invention defined in claim 1 further characterized by said first ring member having an opening on its underside opening to the annular recess and externally of the housing.

3. The invention defined in claim 3 further characterized by the first member having on its annular flange a slot that opens to the flange's outer surface and passes adjacent the opening in the first ring member as the shaft rotates.

4. The invention defined in claim 1 further characterized by the second ring member having an internal annular groove, and said second ring member is fixed to rotate with the shaft by means of an O-ring seated in the latter groove and engaging the shaft.

5. The invention defined in claim 1 further characterized by the first ring having an external groove therein and an O-ring in said groove bearing against a housing portion.

6. A sealing structure for a shaft-carrying housing comprising: a pair of rings fixed respectively to the housing and the shaft, said rings being concentric with the shaft and having radially extending adjoining surfaces with one of said rings having an annular recess spaced radially from the shaft surface and extending axially from the aforesaid radially extending adjoining surfaces and the other of said rings having an annular flange extendng radially from the aforesaid radially extending adjoining surfaces and within the recess, said flange having at least one axially extending slot therein and said ring having the recess therein also having an opening therein extending from the recess to outside the housing.

7. The invention defined in claim 6 further characterized by the flange and recess being rectangular in cross section and having adjoining and complementary inner and outer axially extending annular surfaces.

8. The invention defined in claim 7 in which the inner surfaces of the flange and recesses have a radial spacing of at least 0.005 inches and the outer surfaces of the flange and recess have a radial spacng therebetween of at least 0.005 inches.

9. The invention defined in claim 6 characterized by the ring that is fixed to the shaft is fixed thereto by an O-ring betwn the outer surface of the shaft and the inner surface of the ring.

10. The invention defined in claim 6 further characterized by the ring that is fixed to the housing has internal annular grooves closely adjacent the shaft so that material moving along the shaft will catch in the grooves and further characterized by the internal grooves having a passageway for moving the material into the housing.

* * * * *

Disclaimer 4,022,479.—*David C. Orlowski,* Rock Island, Ill. SEALING RINGS. Patent dated May 10, 1977. Disclaimer filed July 13, 1990, by the inventor.

Hereby enters this disclaimer to claims 1, 2, and 4 of said patent.
[*Official Gazette September 18, 1990.*]

UNITED STATES PATENT AND TRADEMARK OFFICE
CERTIFICATE OF CORRECTION

PATENT NO. : 4,022,479
DATED : May 10, 1977
INVENTOR(S) : David C. Orlowski

It is certified that error appears in the above-identified patent and that said Letters Patent is hereby corrected as shown below:

Column 4, line 18, "3" should read --2--.

Column 4, line 40, "extendng" should read --extending--.

Column 4, line 57, "betwn" should read --between--.

Signed and Sealed this

Fourth Day of December, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,022,479

DATED : May 10, 1977

INVENTOR(S) : Davod C. Oriowski

It is certified that error appears in the above-identified patent and that said Letters Patent is hereby corrected as shown below:

Column 4, line 40, change "radially" (first occurrence) to --axially--.

Signed and Sealed this

Twelfth Day of March, 1991

*Attest:*

HARRY F. MANBECK, JR.

*Attesting Officer*  *Commissioner of Patents and Trademarks*